United States Patent [19]

Manske

[11] Patent Number: 4,457,253

[45] Date of Patent: Jul. 3, 1984

[54] CRITICAL TEMPERATURE INDICATOR

[75] Inventor: Wendell J. Manske, Birchwood, Minn.

[73] Assignee: Minnesota Mining and Manufacturing Company, St. Paul, Minn.

[21] Appl. No.: 440,265

[22] Filed: Nov. 9, 1982

[51] Int. Cl.$^3$ ............................................. G01K 11/00
[52] U.S. Cl. ................................... 116/216; 116/217; 374/159; 374/160
[58] Field of Search ............... 374/154, 160, 161, 162, 374/27; 116/216, 217, 218, 219, 207; 426/88

[56] References Cited

U.S. PATENT DOCUMENTS

| | | | |
|---|---|---|---|
| 3,055,759 | 9/1962 | Busby et al. | 426/88 |
| 3,090,236 | 5/1963 | Nicol | 374/160 |
| 3,233,459 | 2/1966 | Gleason et al. | 374/160 |
| 3,631,721 | 1/1972 | Nollen | 73/368.3 |
| 4,051,804 | 10/1977 | Garnett | 426/88 |
| 4,145,918 | 3/1979 | Couch et al. | 116/216 |
| 4,148,748 | 4/1979 | Hanlon et al. | 252/408 |
| 4,191,125 | 3/1980 | Johnson | 116/219 |

*Primary Examiner*—Charles Frankfort
*Assistant Examiner*—David R. Schuster
*Attorney, Agent, or Firm*—Donald M. Sell; James A. Smith; David W. Anderson

[57] ABSTRACT

A critical temperature indicator is provided utilizing the volume reduction characteristics of organic compounds as they undergo a change from the liquid state to the solid state. A capillary tube sealed at one end contains a first organic compound adjacent the closed end and a second colored organic compound which has a solidification temperature lower than that of the first compound and which is separated from the first compound by a liquid which is immiscible with either the first or the second compounds. The separating liquid also has a solidification temperature lower than that of the first compound. A colorless or white porous plug is located within the separating liquid and frictionally engages the tube to prevent movement of the plug with respect to the tube. The volume of the separating liquid is such that contact between the colored compound and the plug is prevented prior to solidification of the first compound and solidification of the first compound draws the colored compound into the plug to color the plug and provide a visual indication that the first compound has solidified.

16 Claims, 3 Drawing Figures

CRITICAL TEMPERATURE INDICATOR

BACKGROUND OF THE INVENTION

1. Technical Field of the Invention

This invention relates to critical temperature indicators. More particularly, it relates to critical temperature indicators which provide an irreversible visual signal to the user that a product has been exposed to a predetermined temperature, usually near the freezing point of water.

2. Description of the Prior Art

Blood, emulsions, pharmaceuticals, beverages, and other items are often chilled in order that they may be preserved for use sometime later. However, the characteristics of these items may change so that they are undesirable for later use or the items may be rendered completely useless if exposed to a lower temperature, usually the freezing point of water. It is, therefore, desirable to provide an indicator device which will accurately show whether or not the temperature of an item or the environment has decreased below a critical value.

It is also desirable that the device provide its indication rapidly and that the indication be irreversible so that the user will be alerted to a past frozen condition, even if that condition does not presently exist.

Many critical temperature indicators have been provided which utilize the expansion characteristic of water to break a frangible ampule as, for example, Couch et al U.S. Pat. No. 4,145,918. Once the device shown in the Couch et al patent is exposed to temperatures below the freezing point of water, the volume increase as the water changes to ice causes the ampule to break. After the ice has formed and after the surrounding temperature has returned to a point above the melting point of the ice, the water is absorbed by a dye loaded pad, thus providing an indication that the device had gone through a freeze stage and back through a thaw stage.

Problems have arisen in giving an accurate indication of the passage of the device through the normal freezing point of water, i.e., 32° F. (0° C.), due to the super-cooling effect of water which will permit water in small containers to stay in its liquid state substantially below its normal freezing point. Under some conditions, water may be cooled to as low as 3.2° F. (−16° C.) without freezing. This problem has been partially overcome by the addition of certain nucleating agents to the water.

U.S. Pat. No. 4,191,125, issued to Johnson, for example, discloses that cupric sulfide powder may be used as a nucleating agent to reduce the tendency of water to super-cool. The use of such a nucleating agent, however, has not proven entirely successful since an example in the Johnson patent indicates that out of several hundred of the devices exposed to an environment at 26.6° F. (−3° C.), no devices were activated after one hour.

Such an inaccurate performance is undesirable and it is an object of this invention to provide an indicator which will avoid such inaccuracy.

SUMMARY OF THE INVENTION

A critical temperature indicator according to the present invention produces a visual, irreversible indication that the device has been subjected to a selected critical temperature.

The device includes a capillary tube which is sealed at one end and open to the atmosphere at the other. The tube contains a first organic compound at its closed end and a second organic compound saturated with a dye toward its open end which are separated by a liquid which is not miscible with either of the organic compounds. Located within the separating liquid is a porous plug of non-woven material which is transparent or white in color. The organic compound at the closed end of the tube has the characteristic of undergoing a volume reduction upon solidification. This volume reduction draws the dyed compound to the porous pad which sorbs the dyed compound, thus producing a visual indication that the solidification temperature of the first compound has been reached. The porous pad retains the colored compound and produces a constant, irreversible indication.

DETAILED DESCRIPTION OF THE INVENTION

Figure 1:
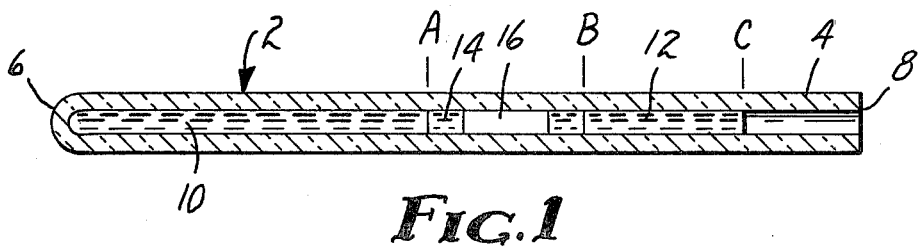
FIG. 1 is a longitudinal cross-sectional side view of a first embodiment of a critical temperature indicator according to the present invention.

Referring to FIG. 1, there is shown a critical temperature indicator according to the present invention, generally indicated by the numeral 2. The indicator is a glass or plastic capillary tube 4 which has a closed end 6 and an open end 8. Located within the closed end 6 of the indicator 2 is an organic compound 10 which has a desired solidification temperature. It is necessary that the compound 10 be one which has the characteristic of undergoing a relatively large volume reduction (8 to 11 percent, preferably) upon solidification. Fatty acid esters have been found to exhibit this characteristic, and particularly suitable organic compounds along with their solidification temperatures are listed below in Table 1.

TABLE I

| Organic Compound | Solidification Temperature °F. (°C.) |
|---|---|
| Octyl Caprylate | −1.3 (−18.5) |
| Heptyl Caprylate | 1.4 (−17) |
| Hexyl Laurate | 11.3 (−11.5) |
| Octyl Caprate | 25.7 (−3.5) |
| Butyl Myristate | 32 (0) |
| Isopropyl Myristate | 23.9 (−4.5) |
| Decyl Caprate | 42.8 (6) |
| Ethyl Myristate | 44.6 (7) |
| Isopropyl Palmitate | 50 (10) |
| Lauryl Caprate | 67.1 (19.5) |
| Butyl Stearate | 68.9 (20.5) |
| Decyl Myristate | 70.7 (21.5) |
| Octadecyl Acetate | 84.2 (29) |
| Lauryl Palmitate | 95.9 (35.5) |
| Cetyl Palmitate | 120.2 (49) |

Although the indicator 2 will be described for convenience as operating at 32° F. (0° C.), this will be true only if butyl myristate is selected as the compound 10 used to fill the closed end 6 of the tube 4. The indicator 2 can be made to operate at any of the temperatures listed in Table I by substituting the corresponding compound, and since most organic compounds go through a volume reduction upon solidification, a wide range of operating temperatures are possible. Table I is provided merely to illustrate some of the possible compounds which may be used and is not intended to limit the invention to those compounds.

Between the levels of the capillary tube 4 labeled "B" and "C", there is located a second organic compound 12 in which is dissolved a dye which colors the compound 12. The colored organic compound 12 may be any compound which has a solidification temperature lower than the compound 10 which is located at the closed end 6 of the tube 4. Any of the compounds listed in Table I are suitable and it has been found that trioctyl phosphate and bis(2-ethylhexyl) phthalate are suitable as well. The dye used to color the organic compound 12 may be any dye which is compatible with and will dissolve in the compound 12. Waxoline Violet BA, available from ICI United States, Inc., has been found to be a particularly suitable dye.

Located in the capillary tube 4 between the two organic compounds 10 and 12 and, therefore, between the limits denoted in FIG. 1 as "A" and "B", there is a liquid 14 which separates the two organic compounds 10 and 12 and prevents mixing thereof. The required characteristics of the separating liquid 14 are that its solidification temperature must be lower than that of the organic compound 10 located at the closed end 6 of the tube 4 and that the liquid 14 be immiscible with either of the organic compounds 10 or 12. A saturated solution of nickel II nitrate in water has been found to fulfill these requirements, but perfluorocarbon compounds, which are completely fluorinated organic compounds such as those manufactured by the 3M Company under the trademark "Fluorinert", or other aqueous solutions of salts such as ammonium chloride, calcium chloride, iron chloride, lithium chloride, potassium bromide, potassium chloride, potassium iodide, sodium bromide, sodium chloride or sodium nitrate have been demonstrated to work as well. Water may be used without a salt in solution if the temperature to be indicated is above the freezing temperature of water.

Within the separating liquid 14 is a porous plug 16 which may be a woven or non-woven material of natural or synthetic fibers such as cotton or polypropylene but preferably is blown micro-fiber polypropylene which repels water but has a sorptive affinity for organic compounds. Such a substance is manufactured by the 3M Company. The plug 16 is forced into the tube 4 and is sized to engage the tube 4 frictionally and maintain its position. The plug 16 must be transparent or white in color to differentiate the plug 16 from the color of the dyed compound 12.

The volumes of the organic compounds 10 and 12 and the separating liquid 14 depend upon the dimensions of the capillary tube 4 and may be calculated if these dimensions are known. The different materials may be injected into the indicator 2 sequentially, as by a hypodermic syringe, or may be introduced into the tube 4 by heating the indicator 2 and allowing the materials to be drawn into the tube 4 as it cools, but the porous plug 16 must be inserted into the separating liquid 14 before the introduction of the dyed compound 12.

In operation, the levels "A", "B", and "C" will maintain their positions with respect to each other, but will move either toward the tube opening 8 or the closed end 6 of the tube 4 as the indicator 2 is heated or cooled, respectively. The volumes of the compounds 10 and 12 and the liquid 14 are selected such that level "C" does not move past the opening 8 and level "A" does not reach the porous plug 16 at expected storage temperatures and level "B" approaches but does not reach the porous plug 16 when the temperature of the indicator 2 is near the solidification temperature of the compound 10 located in the closed end 6 of the tube 4. When the compound 10 solidifies, the sudden volume reduction of the compound 10 draws the dyed compound 12 into contact with the porous plug 16 where it is sorbed by the plug 16, thereby staining the plug 16 the color of the compound 12.

It is thus necessary that the separating liquid 14 and the colored compound 12 have solidification temperatures lower than the compound 10 so that the liquid 14 and the colored compound 12 may be drawn toward the closed end 6 of the tube 4 rather than solidifying within the capillary tube 4.

The visual indication provided by the dyed compound 12 entering the porous plug 16 will be irreversible because the plug 16 will retain at least a portion of the dyed compound 12 even if the temperature should rise and the separating liquid 14 once again moves beyond the porous plug 16.

Figure 2:
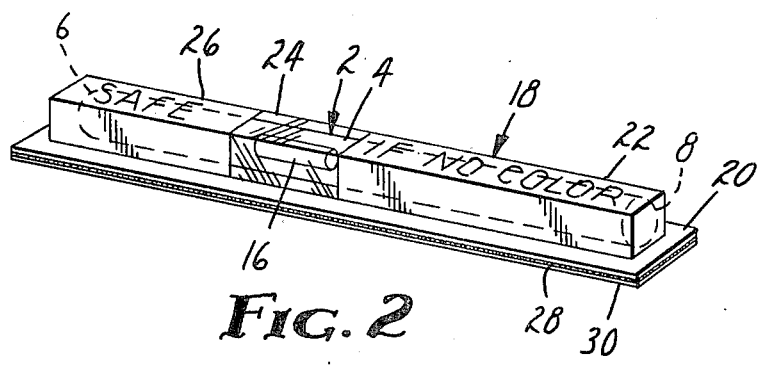
FIG. 2 is a perspective view of an indicator housing containing the critical temperature indicator of FIG. 1.

FIG. 2 illustrates a housing, generally indicated as 18, for the critical temperature indicator 2 which will allow the indicator 2 to be attached to an article to be monitored. The housing 18 includes a base 20 and a raised portion 22 which contains and protects the critical temperature indicator 2. A transparent portion 24 of the housing is provided which corresponds to the location of the porous plug 16. The raised portion 22 of the housing 18 further includes a legend 26 which indicates that if the plug 16 is not colored, the solidification temperature of the critical temperature indicator 2 has not yet been reached. The underside of the base 20 is coated with a pressure-sensitive adhesive 28 which is protected by a removable release liner 30. The indicator housing 18 may be attached to an article by removing the release liner 30 and pressing the adhesive 28 against the article. Color within the porous plug 16 will thus provide a visual indication through the transparent portion 24 of the housing 18 that the article has been subjected to a temperature below the solidification temperature of the selected compound 10.

Figure 3:
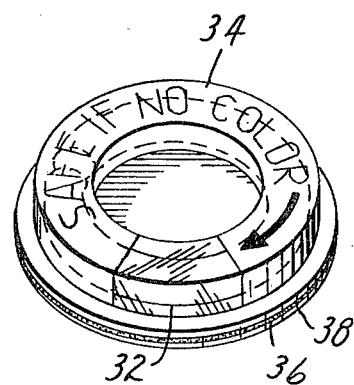
FIG. 3 is a perspective view of a second embodiment of a critical temperature indicator and housing according to the present invention.

FIG. 3 illustrates a second embodiment of a critical temperature indicator 32 which is bent into a circle and contained and protected by a circular housing 34. The housing 34 may also be attached to an article by means of a pressure-sensitive adhesive 36 which is protected by a removable release liner 38. FIG. 3 illustrates that many shapes of the critical temperature indicator 2 are possible, so long as the volumetric relationships between the compounds 10 and 12 and the separating liquid 14 are retained.

From the foregoing description of the exemplified embodiments, it will be apparent that many modifications may be made therein. It will be understood, therefore, that the embodiments are intended as illustrations of the invention only and that the invention is not limited thereto. It is intended in the appended claims to cover all such modifications as fall within the true scope of the invention.

I claim:

1. A critical temperature indicator comprising:
   a capillary tube closed at one end;

a first liquid extending from said closed end partially throughout said tube which is capable of solidification and exhibits the property of volume reduction upon solidification;

a colored second liquid located within said tube which has a solidification temperature lower than that of said first liquid;

a separating liquid interposed between said first and second liquids which is immiscible with either of said first or second liquids to prevent mixing thereof and which has a solidification temperature lower than that of said first liquid; and a porous plug capable of sorbing said second liquid located within said separating liquid and frictionally engaging said tube to prevent movement of said plug with respect to said tube;

the volumes of said first liquid and said separating liquid being such that contact between said second liquid and said plug is prevented prior to solidification of said first liquid and solidification of said first liquid draws said second liquid into said plug to color said plug and provide a visual indication that said first liquid has solidified.

2. A critical temperature indicator according to claim 1 further including a dye in solution with said second liquid.

3. A critical temperature indicator according to claim 2 wherein said dye is Waxolene Violet BA.

4. A critical temperature indicator according to claim 1 wherein said first and second liquids are organic compounds.

5. A critical temperature indicator according to claim 4 wherein said first and second liquids are fatty acid esters.

6. A critical temperature indicator according to claim 4 wherein said first liquid is selected from a group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, and cetyl palmitate.

7. A critical temperature indicator according to claim 4 wherein said second liquid is selected from a group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, cetyl palmitate, trioctyl phosphate, and bis(2-ethylhexyl) phthalate.

8. A critical temperature indicator according to claim 7 further including a dye in solution with said second liquid.

9. A critical temperature indicator according to claim 8 wherein said dye is Waxolene Violet BA.

10. A critical temperature indicator according to claim 1 wherein said separating liquid is an aqueous salt solution.

11. A critical temperature indicator according to claim 10 wherein said salt is selected from the group consisting of ammonium chloride, calcium chloride, iron chloride, lithium chloride, potassium bromide, potassium chloride, potassium iodide, sodium bromide, sodium chloride or sodium nitrate.

12. A critical temperature indicator according to claim 1 wherein said separating liquid is a perfluorocarbon.

13. A critical temperature indicator according to claim 1 wherein said separating liquid is a saturated solution of nickel II nitrate in water.

14. A critical temperature indicator according to claim 1 wherein said porous pad is a non-woven material.

15. A critical temperature indicator according to claim 14 wherein said material is polypropylene.

16. A critical temperature indicator according to claim 14 wherein said material is blown micro-fiber polypropylene.

* * * * *